US011620132B2

(12) United States Patent
Fleischer et al.

(10) Patent No.: US 11,620,132 B2
(45) Date of Patent: Apr. 4, 2023

(54) REUSING AN OPERAND RECEIVED FROM A FIRST-IN-FIRST-OUT (FIFO) BUFFER ACCORDING TO AN OPERAND SPECIFIER VALUE SPECIFIED IN A PREDEFINED FIELD OF AN INSTRUCTION

(71) Applicant: INTERNATIONAL BUSINESS MACHINES CORPORATION, Armonk, NY (US)

(72) Inventors: Bruce Fleischer, Bedford Hills, NY (US); Sunil Shukla, Scarsdale, NY (US); Vijayalakshmi Srinivasan, New York, NY (US); Jungwook Choi, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/406,839

(22) Filed: May 8, 2019

(65) Prior Publication Data
US 2020/0356371 A1 Nov. 12, 2020

(51) Int. Cl.
*G06F 9/38* (2018.01)
*G06F 9/30* (2018.01)

(52) U.S. Cl.
CPC .......... *G06F 9/3824* (2013.01); *G06F 9/3001* (2013.01); *G06F 9/30185* (2013.01)

(58) Field of Classification Search
CPC ... G06F 9/3824; G06F 9/3001; G06F 9/30185
See application file for complete search history.

(56) References Cited

U.S. PATENT DOCUMENTS

| 5,299,320 A * | 3/1994 | Aono ................. G06F 9/30036 712/2 |
| 5,983,340 A * | 11/1999 | Garey ................ G06F 9/30163 712/200 |
| 2002/0032851 A1 * | 3/2002 | Kyker .................. G06F 9/3016 712/211 |
| 2003/0159021 A1 | 8/2003 | Kerr et al. |
| 2004/0168044 A1 * | 8/2004 | Ramchandran ......... G06F 13/16 712/220 |
| 2015/0026437 A1 * | 1/2015 | Achenbach ............. G06F 9/384 712/216 |
| 2019/0004801 A1 * | 1/2019 | Haber ................. G06F 9/30036 |

OTHER PUBLICATIONS

Takamura et al, Reducing access count to register-files through operand reuse, 2003, ACSAC LNCS, 10 pages (Year: 2003).*
Tseng et al, Energy-efficient register access, 2000, IEEE, 0-7695-0843-X/00, 6 pages (Year: 2000).*
Zargham, Computer Architecture, 1996, Prentice Hall, 31 pages (Year: 1996).*

* cited by examiner

*Primary Examiner* — Keith E Vicary
(74) *Attorney, Agent, or Firm* — Griffiths & Seaton PLLC

(57) ABSTRACT

Various embodiments are provided reusing an operand in an instruction set architecture (ISA) by one or more processors in a computing system. An instruction may specify that an operand register for a selected operand retain operand data used by a previous instruction. The operand data in the operand register may be reused by the instruction.

7 Claims, 14 Drawing Sheets

REUSING AN OPERAND RECEIVED FROM A FIRST-IN-FIRST-OUT (FIFO) BUFFER ACCORDING TO AN OPERAND SPECIFIER VALUE SPECIFIED IN A PREDEFINED FIELD OF AN INSTRUCTION

BACKGROUND OF THE INVENTION

Field of the Invention

The present invention relates in general to computing systems, and more particularly to various embodiments for reusing an operand in an instruction set architecture (ISA) in a computing system using a computing processor.

Description of the Related Art

Computing systems may be found in the workplace, at home, or at school. In general, a computer system may include one or more processors that comprise a digital integrated circuit including, for example, one or more execution units for executing sequential instructions, a branch unit for processing branch instructions, and registers for storing instruction operands and result data.

As the complexity of computing systems increase, some computers may perform machine learning (e.g., deep learning), which is a form of artificial intelligence employed to allow computers to evolve behaviors based on empirical data. Due to the recent technological advancements and growing popularity of machine learning, a need exists to increase the computing efficiency without requiring additional hardware components of the processor/computer such as, for example, when performing machine learning.

SUMMARY OF THE INVENTION

Various embodiments for reusing an operand in an instruction set architecture (ISA) by one or more processors in a computing system, are provided. In one embodiment, by way of example only, a method for reusing an operand in an instruction set architecture (ISA) in a computing system, again by a processor, is provided. An instruction may specify that an operand register for a selected operand retain operand data used by a previous instruction. The operand data in the operand register may be reused by the instruction.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
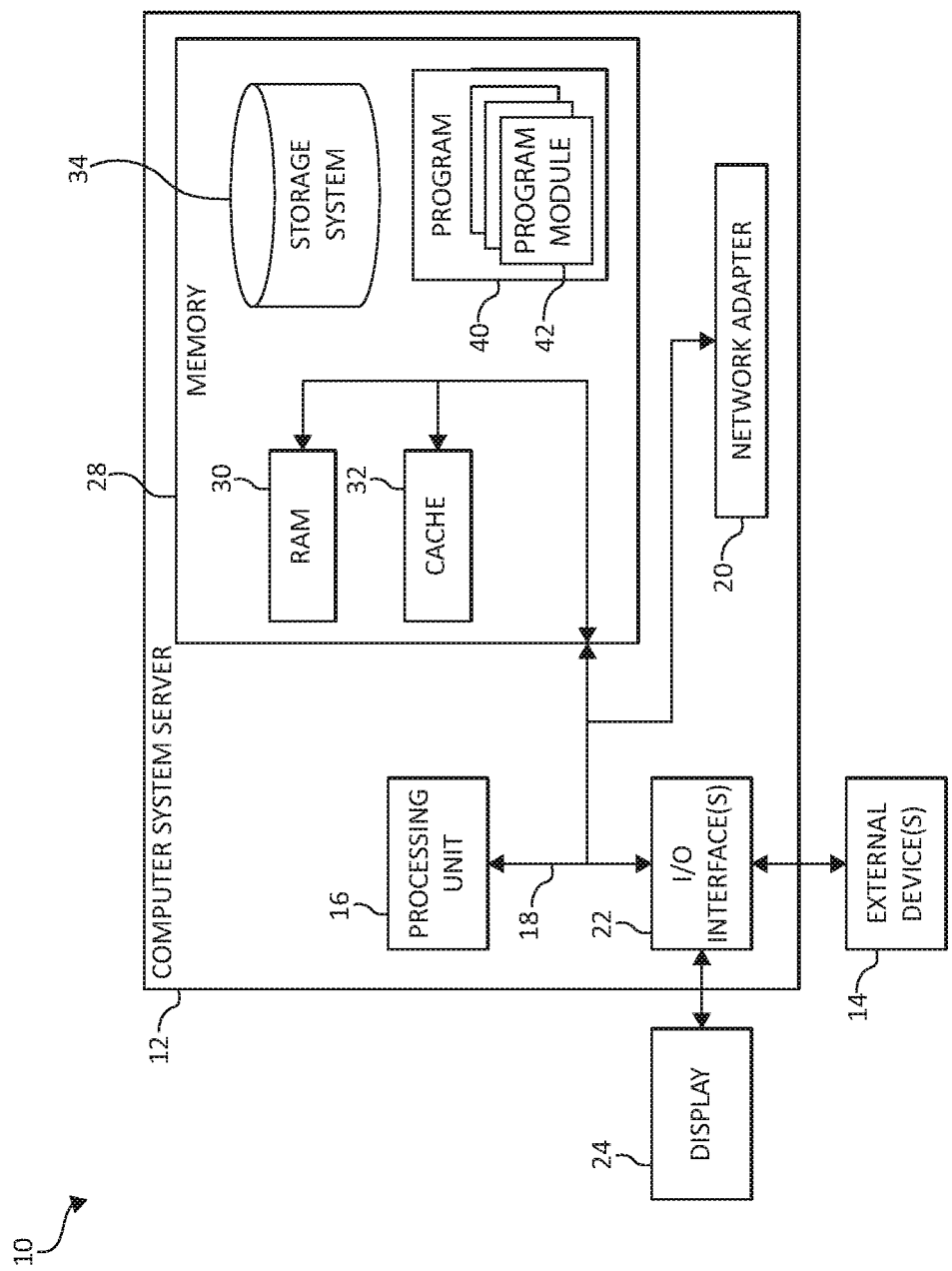
FIG. 1 is a block diagram depicting an exemplary cloud computing node according to an embodiment of the present invention.

The present invention relates generally to the field of computing systems and facilitating data processing by reusing an operand in an instruction set architecture (ISA). In a computing system, an instruction set, or instruction set architecture (ISA), describes the aspects of a computer architecture visible to a programmer, including the native data types, instructions, registers, addressing modes, memory architecture, interrupt and exception handling, and external I/O (if any). The ISA is a specification of the set of all binary codes that are the native form of commands implemented by a particular CPU design. The set of binary codes for a particular ISA is also known as the machine language for that ISA.

In one aspect, selected types of computing processor devices/units (e.g., "processor") for intelligent/cognitive computing such as, for example, deep learning ("DL") applications, must be very power-efficient. For example, unlike current general-purpose processors, DL processors' instruction-fetch logic, instruction-sequencing logic, and register files must be very simple and light-weight. DL applications often require producing two results from two inputs. For example, a program may need to sort two values (e.g., value "a" and value "b") by finding maximum ("max") and/or minimum ("min") of values "a" and "b" such as, for example, max(a, b) and min(a, b). If value a and b are taken from registers and will no longer be needed, the number of required registers may be reduced if the max( ) and min( ) results could replace the inputs. Current sequential semantics do not allow this; if the programmer assigns the result of the first instruction to one of the inputs, the second instruction will stall until that result is available and will then use the result instead of the desired input value.

Additionally, a processor may receive input data from a first-in-first-out buffer ("FIFO") (e.g., an input bus on which the processor can receive data from another processor using a FIFO protocol). It is common for applications to use one data value in multiple instructions such as, for example, to add a common offset to the values in a set of local registers. If the common offset to the values comes from the input FIFO, current processors require that either the common offset be sent multiple times, or the processor move the value from the FIFO input to a local register and use that register in multiple instructions.

Accordingly, a need exists to improve computing efficiencies and data processing by reusing an operand in an instruction set architecture (ISA) while only requiring minimal additional control logic. In one aspect, the present invention provides for facilitating data processing by reusing an operand in an ISA in a computing system. An instruction may specify that an operand register for a selected operand retain operand data used by a previous instruction. The operand data in the operand register may be reused by the instruction.

In an additional aspect, the present invention provides for an ISA to allow one instruction (e.g., the later instruction) to reuse operand data in an operand register from a previous instruction. Although operands used by a selected processor instruction may be loaded into operand registers immediately before a first cycle of execution logic for that instruction, the present invention enables an instruction to specify that an operand register for one of its operands is not required to load a new value. Rather, the operand register may hold the value used from a previous instruction.

In one aspect, the present invention may define, in an ISA, behavior of a selected opcode to have an implicit operand. In one aspect, the implicit operand implicitly uses one or more selected operands of one or more previous instructions. For example, an instruction with two operands may be coded with an instruction format that has only one operand specifier ("specs") and the other operand implicitly reuses the value in its operand register. That value will be the last value loaded by a previous instruction.

In another aspect, the present invention may define, for an instruction format in an ISA, that a new operand specifier code (e.g. a value of an operand specifier field in that instruction format) for an operand means the operand register for that operand may hold its present value. By comparison, defining a new operand specifier code makes more efficient use of opcode bits than defining operands with implicit reuse, because the new operand specifier code can be used with all operations with that instruction format, and doesn't require a new opcode for each instruction with reuse.

It should be noted that one or more calculations may be performed using various mathematical operations or functions that may involve one or more mathematical operations (e.g., performing rates of change/calculus operations, solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
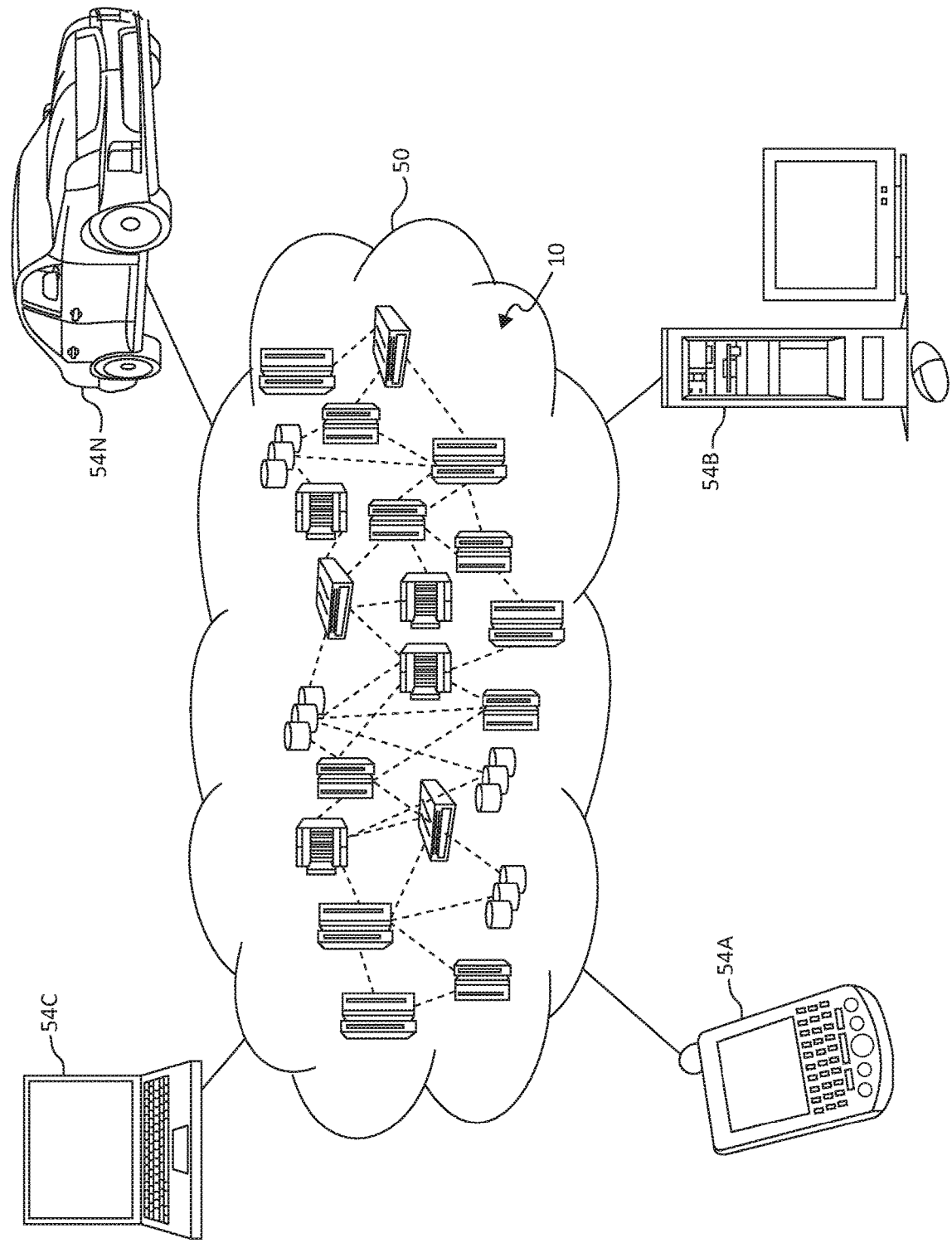
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
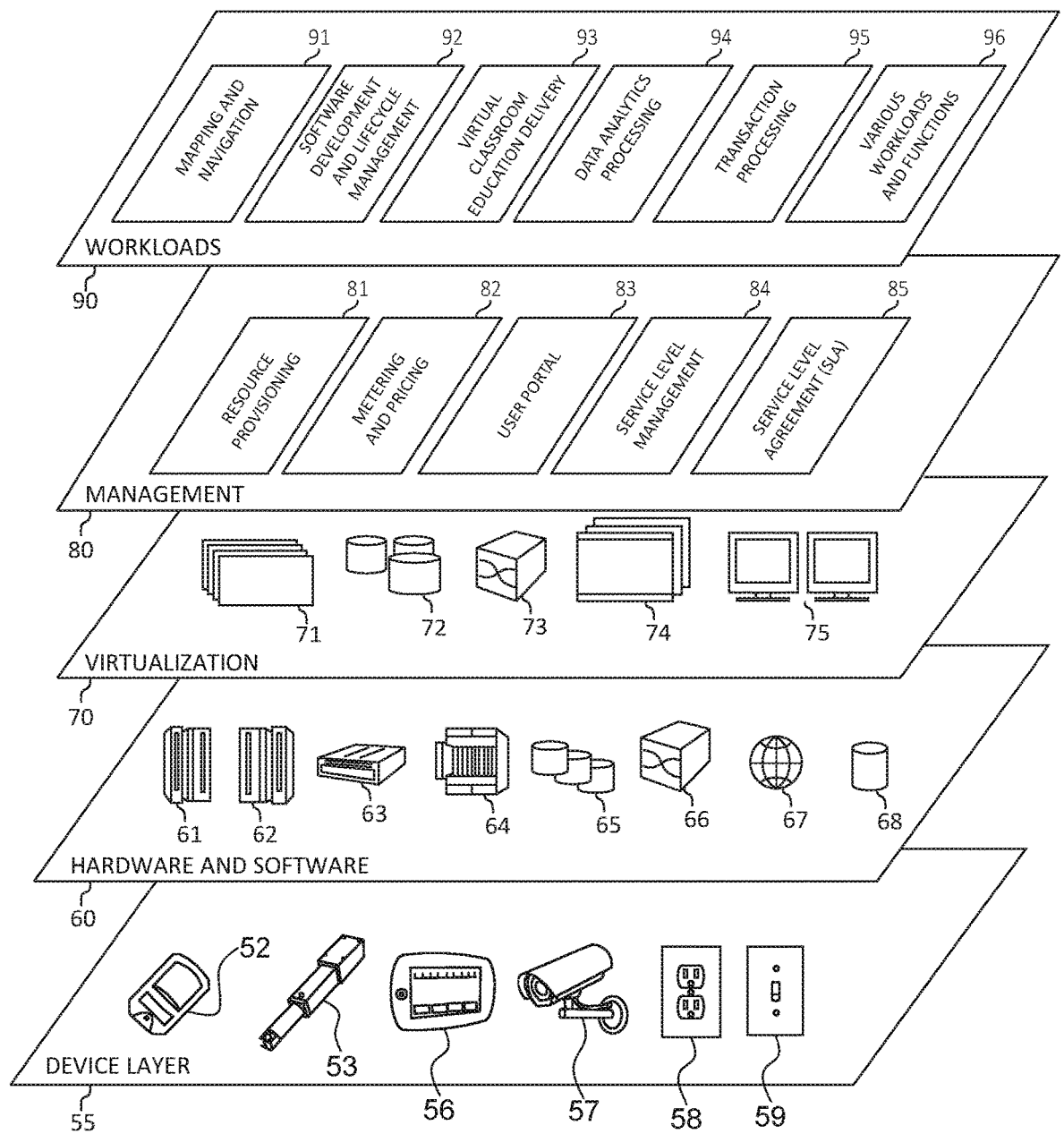
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for reusing an operand in an instruction. In addition, workloads and functions 96 for reusing an operand in an instruction may include such operations as analytics, entity and obligation analysis, and as will be further described, user and device management functions. One of ordinary skill in the art will appreciate that the workloads and functions 96 for reusing an operand in an instruction may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
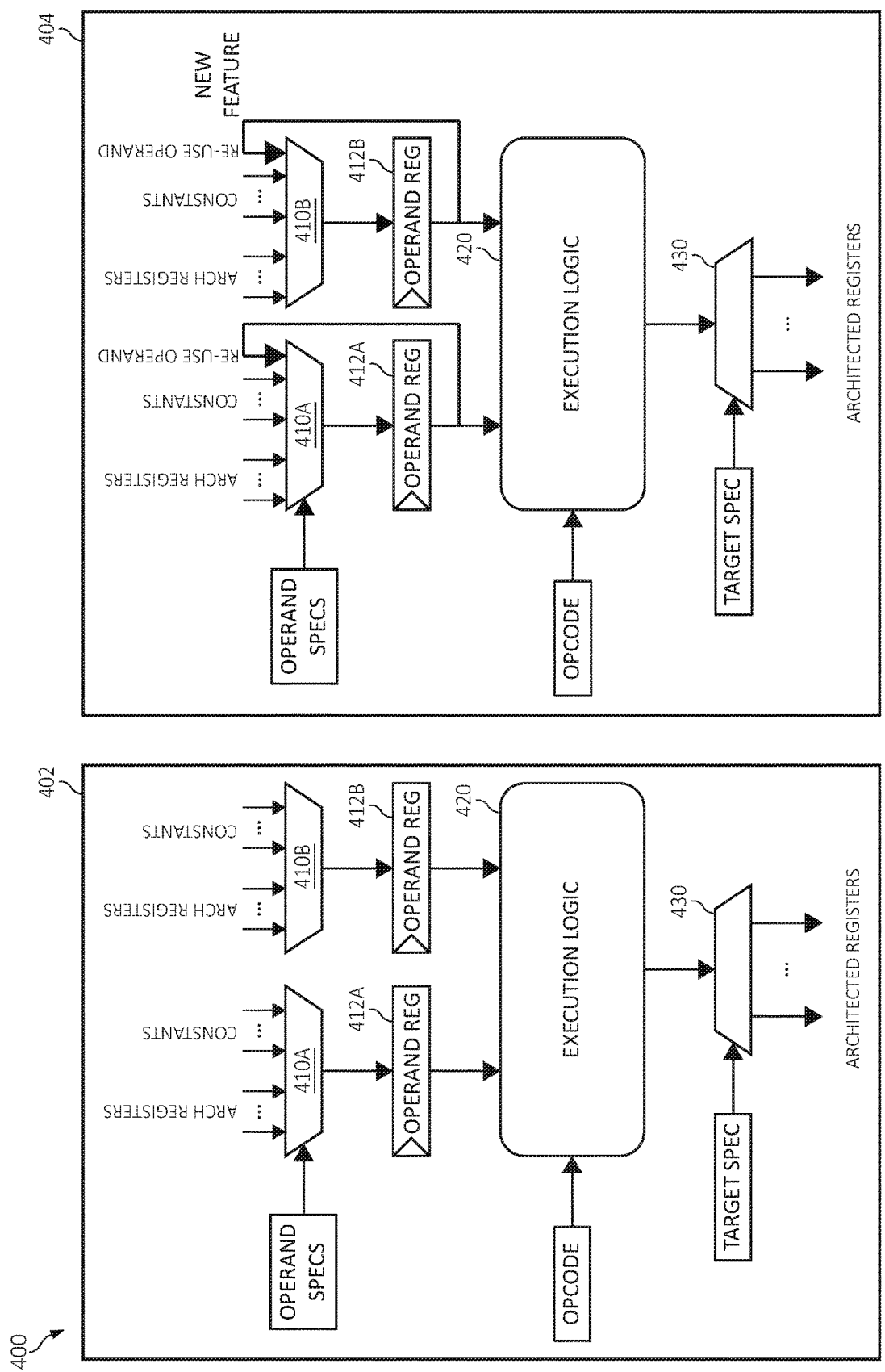
FIG. 4 is an additional block diagram depicting reuse of an operand in an instruction set architecture (ISA) compared with the current state of the art.

FIG. 4 is a comparison diagram 400 depicting a computing system 404 (e.g., enhanced processor system 404) for reuse of an operand in an ISA compared to a current state of the art computing system 402. In one aspect, one or more of the components, modules, services, applications, and/or functions described in FIGS. 1-3 may be used in FIG. 4.

As depicted, a current processor system 402 (e.g., the current state of the art) may include one or more multiplexers ("MUX") such as, for example, operand MUX 410A and operand MUX 410B, one or more registers such as, for example, operand registers 412A and 412B (that may hold values), a processor pipeline 420 (e.g., an execution logic), and a target logic 430 (which may be directed to a register such as, for example, an architected register(s)).

One or more fields in an instruction format according to an ISA may be operand specs. The operand MUX 410A and operand MUX 410B may receive several sources of data and a control signal, which may be determined by an operand spec. The operand spec may indicate to the operand MUX 410A and operand MUX 410B which data source (e.g., an architected register, a FIFO from another processor, a constant, etc.) is to be connected to each of the operand MUX 410A and operand MUX 410B.

The operand MUX 410A and operand MUX 410B may input one or more values according to the operand specs into one or more operand registers such as, for example, operand registers 412A and 412B. The operand registers 412A and 412B may input their respective values into the processor pipeline 420 (e.g., the execution logic) and perform the operations of the opcode (e.g., add, subtract, multiply, minimize, maximize, etc.) with the result sent/directed to the target logic 430 which directs the result to a specified target register (or other targeted location) as indicated in a target specifier field of the instruction such as, for example, one or more architected registers.

However, in contrast to the current processor system 402, the present invention provides an enhanced processor system 404, compared to the current state of the art, by using the same components of the current processor system 402, but enabling an ISA to allow one instruction (e.g., a later instruction) to reuse operand data in the operand registers 412A and 412B from a previous instruction (which may be input back into operand MUX 410A and operand MUX 410B). Although operands may be loaded into the operand registers 412A and 412B immediately before a first cycle of processor pipeline 420 (e.g., an execution logic) for that instruction of the current processor system 402, the enhanced processor system 404 enables an instruction to specify that the operand registers 412A and 412B for one of the operands may not load a new value. Rather, the operand registers 412A and 412B may hold the value used from a previous instruction. The previous instruction is enabled to overwrite one of its inputs in the operand registers 412A and 412B while allowing a subsequent instruction to use the same input value (e.g., the old value of that operand register) in the operand registers 412A and 412B.

To further illustrate, consider the following use cases as depicted in FIGS. 5A-5I. In one aspect, one or more of the components, modules, services, applications, and/or functions described in FIGS. 1-4 may be used in FIGS. 5A-5I. In one aspect, for example, many of the functional blocks previously described in FIG. 4 may be applied and used for executing one or more operations and/or functionality described in FIGS. 5A-5I. Repetitive description of like elements, components, modules, services, applications, and/ or functions employed in other embodiments described herein is omitted for sake of brevity.

Figure 5A:
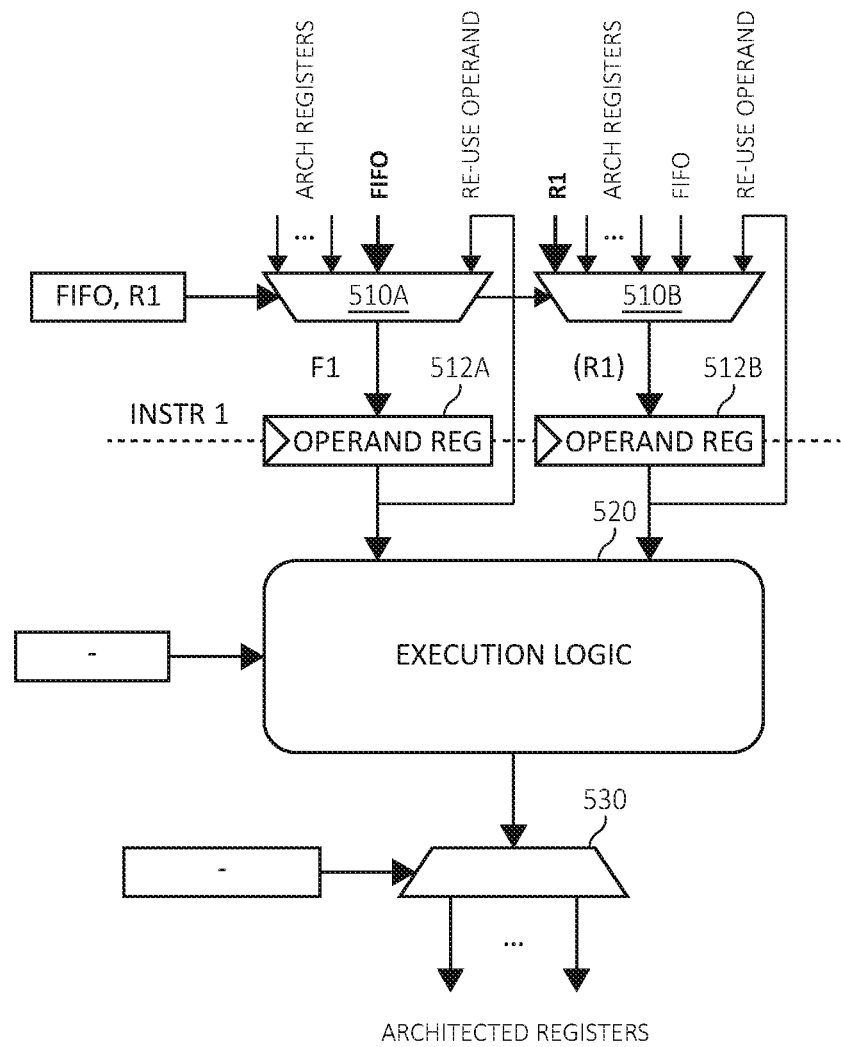
FIG. 5A-5C are additional block diagrams depicting reuse of a single value from a first-in-first-out buffer (FIFO) in accordance with another embodiment of the present invention.
Figure 5B:
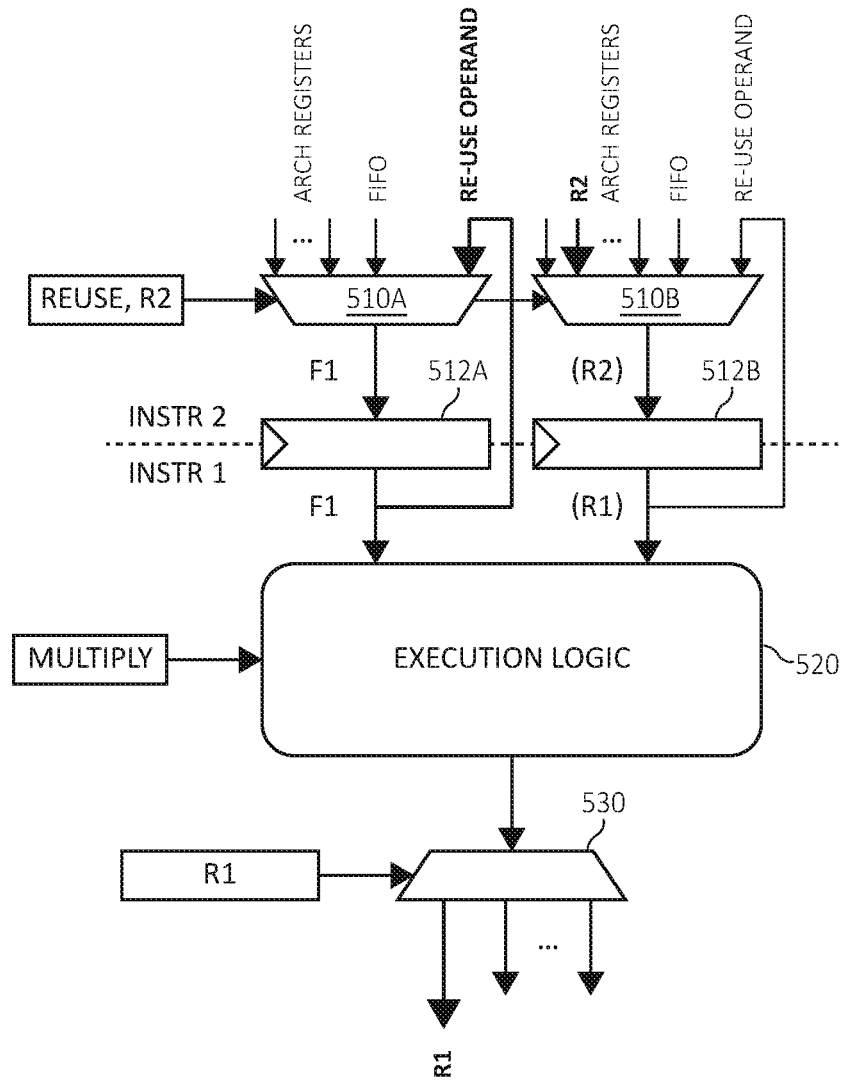
Figure 5C:
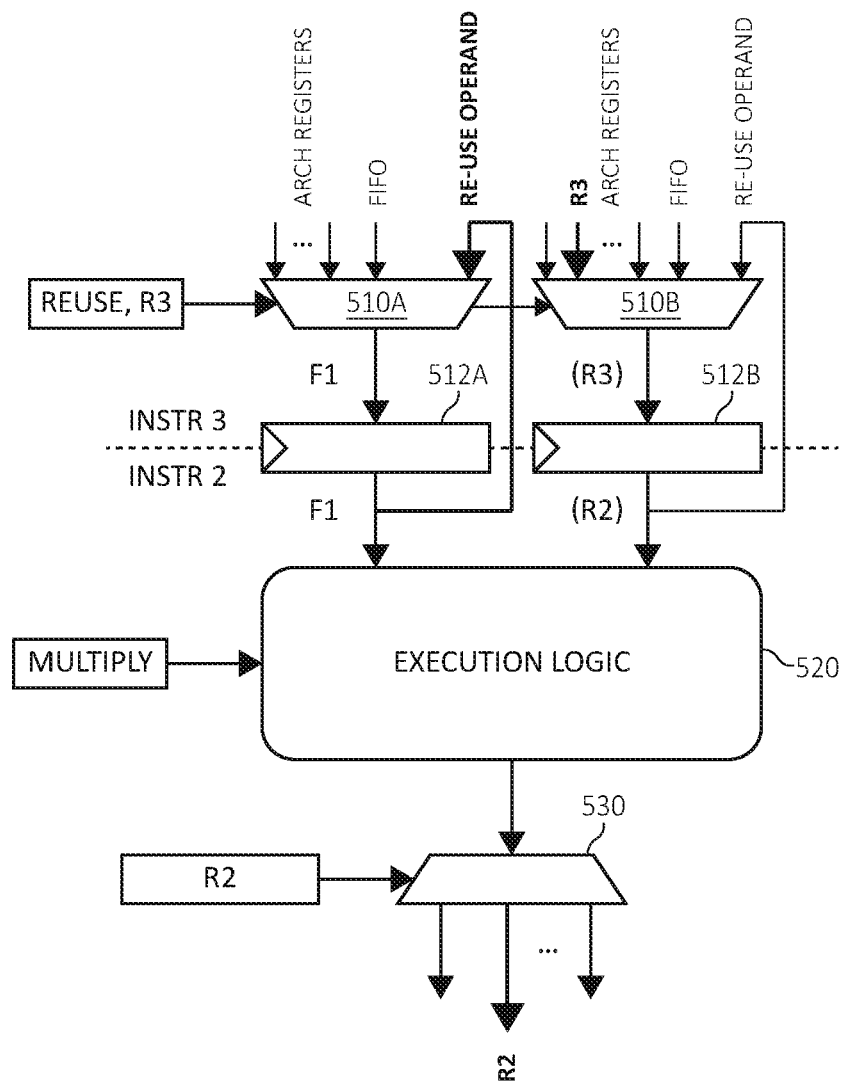

Turning now to FIGS. 5A-5C, block diagrams 500, 525, and 535 depict reusing a single value from a FIFO in a first cycle, second cycle, and third cycle.

In cycle 1 of diagram 500, a value from a FIFO source may be used multiple times in the operand register 512A. That is, a value from an input FIFO may be added as a common offset to multiple registers, which may be illustrated by the following pseudocode:

---

R1 ← FIFO + R1 // Add FIFO value (F) to R1,
R2 ← reuse + R2 // Add same value to R2,
// FIFO source can free storage;
R3 ← reuse + R3 // Add same value to R3.

---

For example, in cycle 1, a first instruction ("Inst 1") may indicate to the operand MUX 510A to use data ("F1") from a FIFO as input into the operand register 512A and may also indicate to operand MUX 510B to use data from a source register (e.g., from R1—"(R1)" indicates the contents of R1) in the operand register 512B (e.g., for R1←FIFO+R1).

In cycle 2, the first instruction ("Inst 1") is now in the execution stage of the processor pipeline 520 and performing an addition operation (e.g., ADD opcode) on the values from the operand register 512A (e.g., F1) and the operand register 512B (e.g., (R1)). The first instruction indicates that the target logic 530 send the result of the addition operation in the processor pipeline 520 to a result register (e.g., R1 in this case).

A second instruction ("Inst 2") of diagram 525 indicates to the operand MUX 510A to reuse the F1 value previously read from the FIFO. Operand register 512A returns the F1 value back to the operand MUX 510A. In this way, the source processor of the FIFO may send the value F1 only one time to the operand MUX 510A and move on to other computations/instructions, but the value F1 may be reused such as, for example, in the operand register 512A. The second instruction indicates to operand MUX 510B to receive the value of R2 and input the value of R2 into the operand register 512B (e.g., for R2←reuse+R2).

In cycle 3, the second instruction ("Inst 2") is now in the execution stage of the processor pipeline 520 and performing an addition operation (e.g., ADD opcode) on the values from the operand register 512A (e.g., F1) and the operand register 512B (e.g., R2). The second instruction indicates that the target logic 530 send the result of the addition operation in the processor pipeline 520 to a result register (e.g., R2 in this case).

A third instruction ("Inst 3") of diagram 535 indicates to the operand MUX 510A to reuse the F1 value previously read from the FIFO operand register 512A and input the Flvalue that was returned to operand MUX 510A into the operand register 512A. The third instruction indicates to operand MUX 510B to receive the value of R3 and input the value of R3 into the operand register 512B (e.g., for R3←reuse+R3).

Figure 5D:
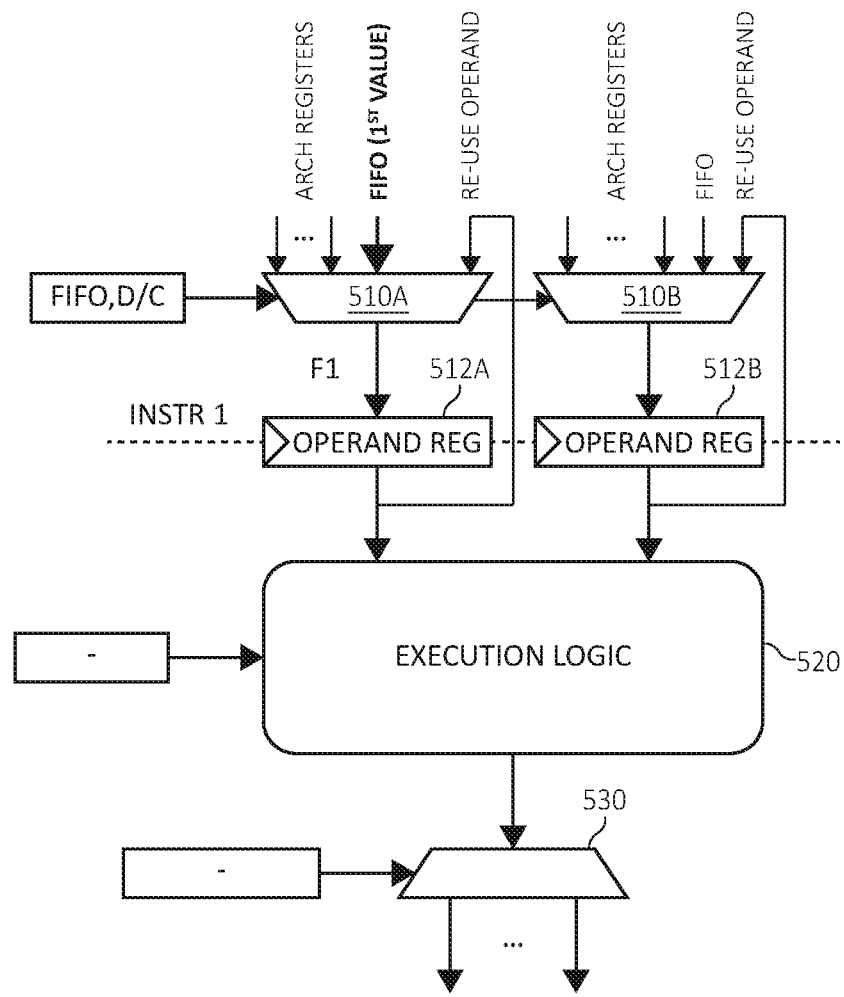
FIG. 5D-5F are additional block diagrams depicting a different reuse of a value from a first-in-first-out buffer (FIFO) in accordance with another embodiment of the present invention.
Figure 5E:
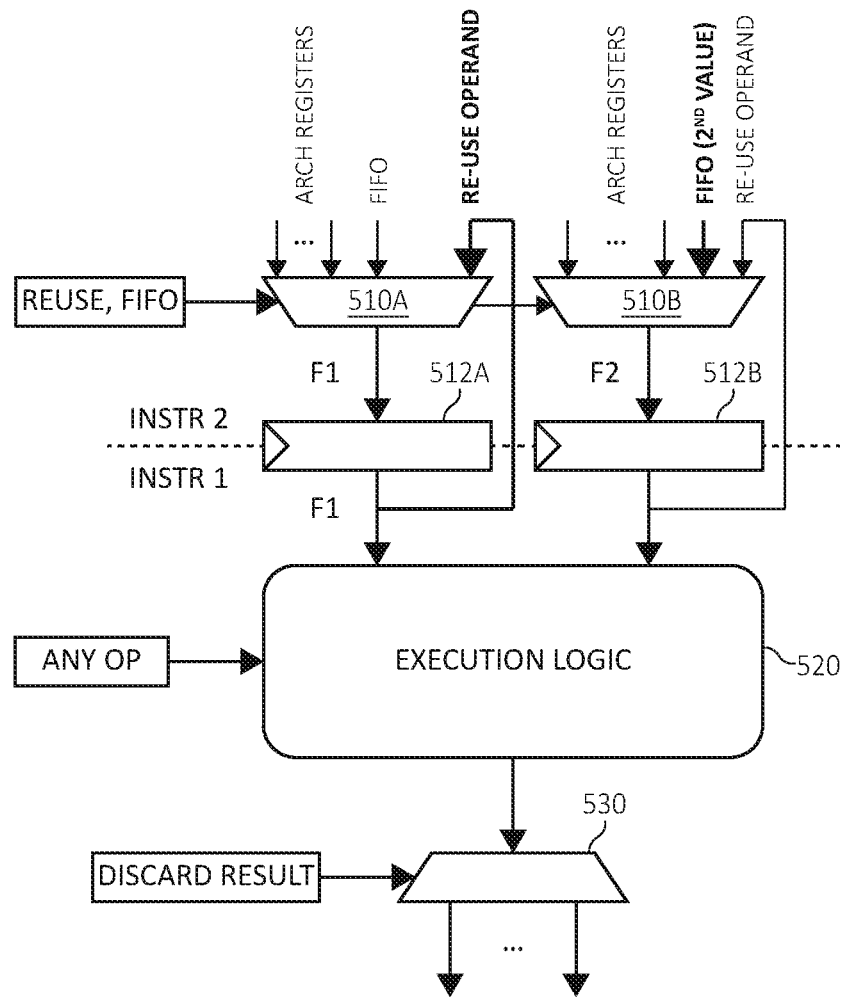
Figure 5F:
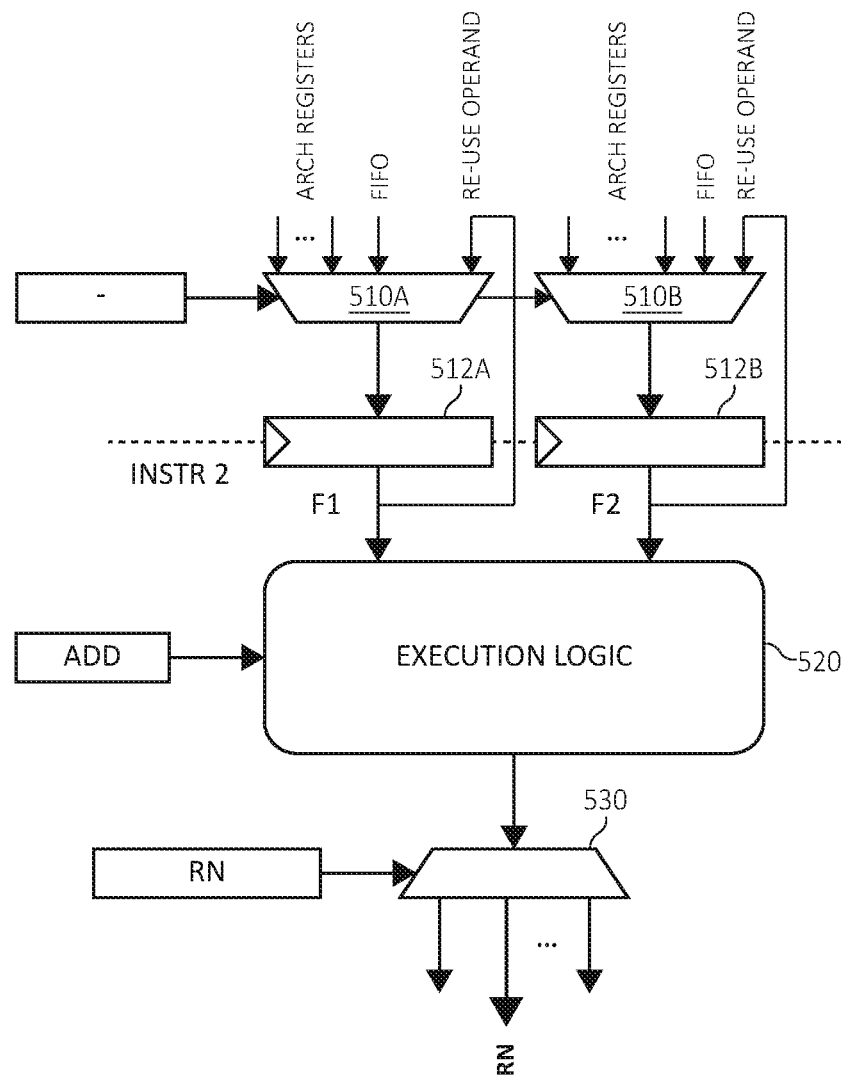

Turning now to FIGS. 5D-5F, block diagrams 545, 555, and 565 depict using reuse to allow the use of two consecutive values from a FIFO in one instruction, such as illustrated in a first cycle, a second cycle, and third cycle of FIGS. 5D-5F.

In one aspect, a processor may need to perform an operation, such as addition, on consecutive values from an input FIFO. With the current processor system 402 of FIG. 4, it would be necessary to move the first value from the FIFO to a local architected register, then add the value in that particular architected register to the next value from the FIFO.

However, with the enhanced processor system 404 of FIG. 4, mechanisms of the illustrated embodiments enable moving a first value from a FIFO to an operand register and adding the value in that operand register to the next value from the FIFO without using architected registers for the FIFO data, or incurring the delay caused by a dependency between the target of one instruction and an operand of the next instruction. The application is illustrated by the following pseudocode:

---

← any op (FIFO) // Take Value F1 from FIFO, do not save result,
R1 ← reuse + FIFO // Add F1 + next value to F2.

---

For example, in cycle 1, a first instruction ("Inst 1") may indicate to the operand MUX 510A to get/read a first value ("Pt value" or "F1") from a FIFO as input into the operand register 512A (e.g., for←any op (FIFO)). (At this point, it is irrelevant as to whether or not a value is input into the operand register 512B).

In cycle 2, the first instruction ("Inst 1") is now in the execution of the processor pipeline 520 and performing one of a plurality of types of operation (e.g., multiply, add, subtract, etc. as the opcode) on the values from the operand register 512A (e.g., F1) and a result may be sent to the target logic 530 and the target logic 530 may discard the result.

A second instruction ("Inst 2") of diagram 555 in cycle 2 indicates to the operand MUX 510A to reuse the F1 value previously read from the FIFO operand register 512A and returned back to the operand MUX 510A. The second instruction indicates to operand MUX 510B to take/read in a second value ("2nd value" or "F2") from a FIFO as input into the operand register 512B (e.g., for R1←reuse+FIFO).

In cycle 3 of diagram 565, the second instruction ("Inst 2") is now in the execution of the processor pipeline 520 and performing the add operation on the values from the operand register 512A (e.g., F1) and the operand register 512B (e.g., F2) and a result may be sent to the target logic 530 (e.g., Rn). That is, F1 and F2 are added in the processor pipeline 520 without requiring any additional registers, modifications to the control logic, or provide additional features in the FIFO, and the like.

Figure 5G:
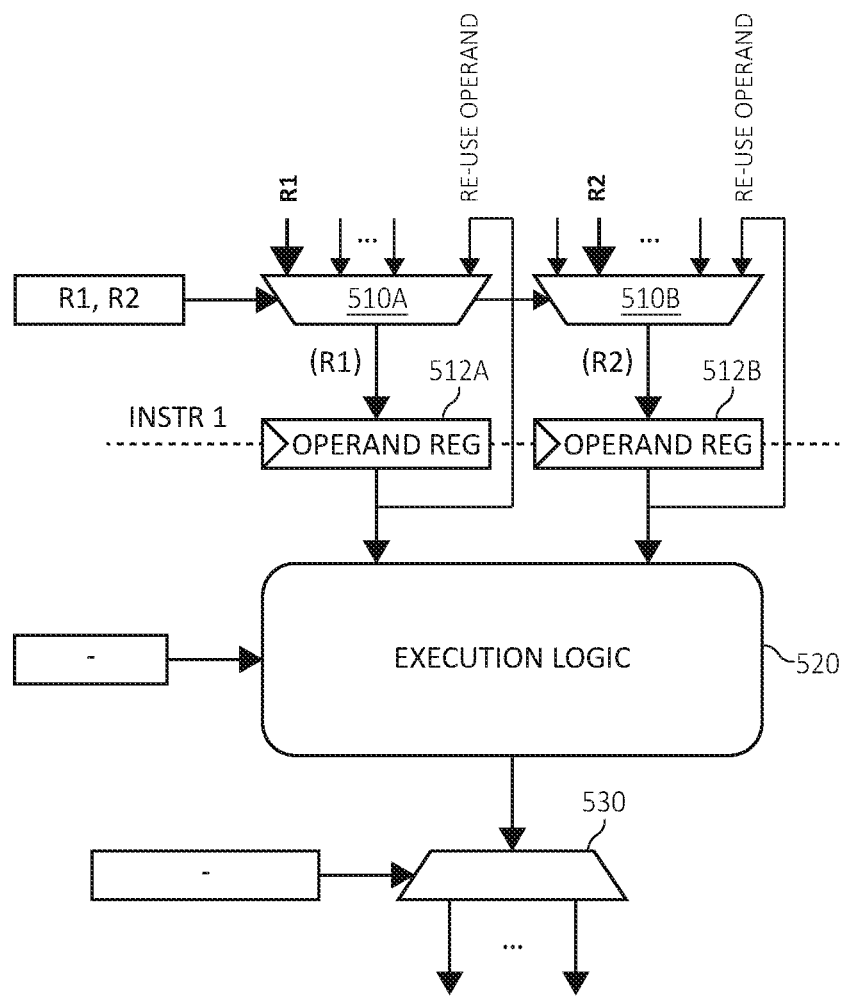
FIG. 5G-5I are additional block diagrams depicting operations on data from two source registers, including reuse of a value from one or more of the source registers to produce results in the two source registers in accordance with another embodiment of the present invention.
Figure 5H:
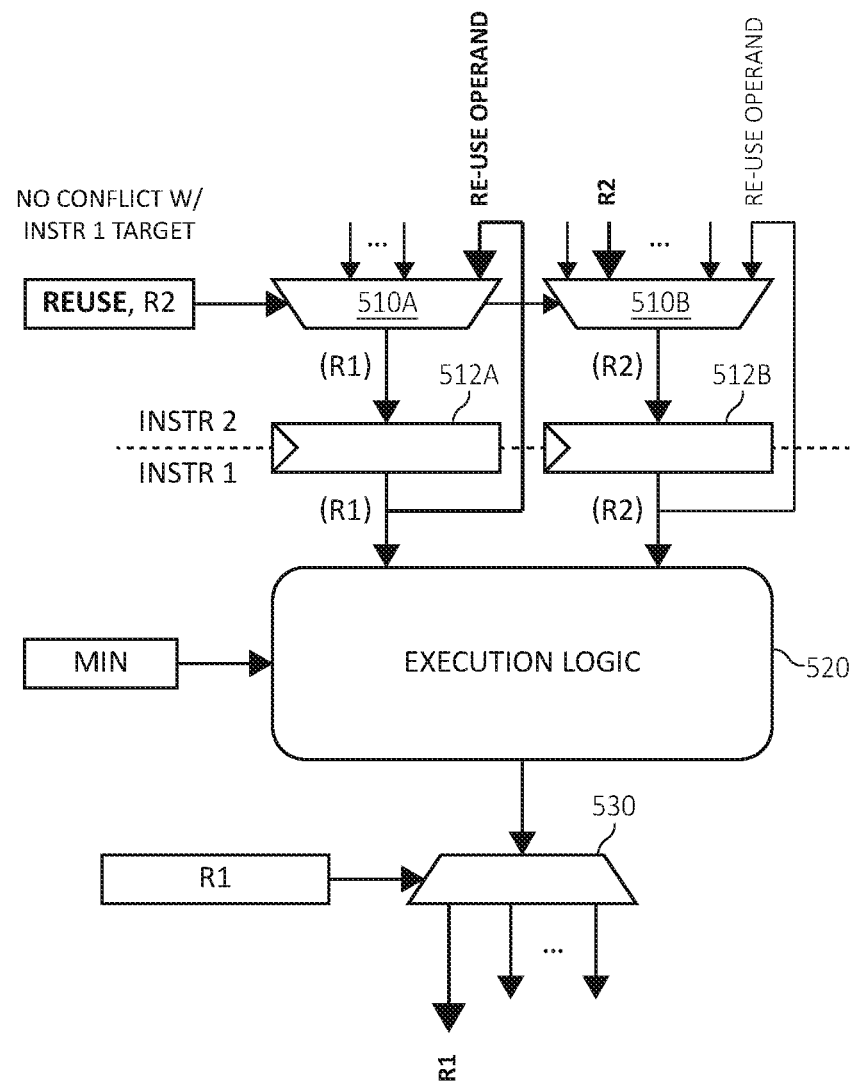
Figure 5I:
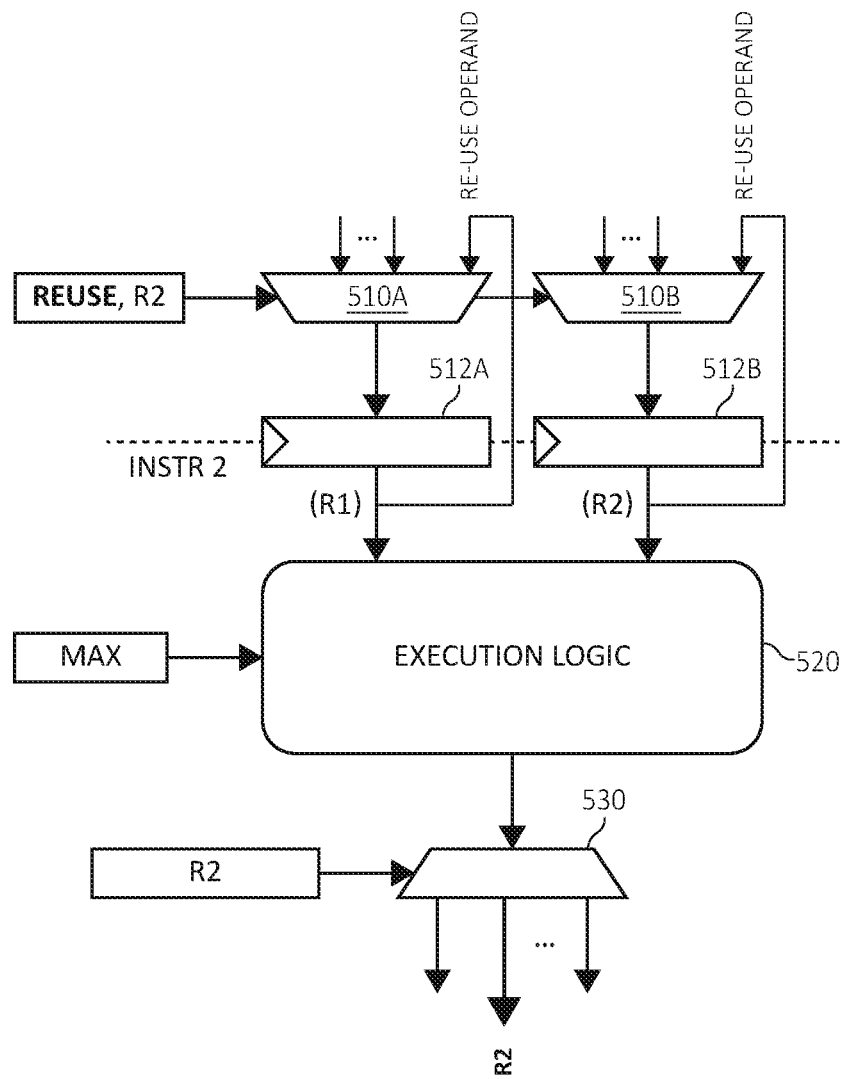

Turning now to FIGS. 5G-5I, block diagrams 575, 585, and 595 depict sorting two registers in place in a first cycle, a second cycle, and third cycle. As a preliminary matter, some applications need to produce two results from two inputs. For example, a computing program may sort two values (e.g., value "a" and value "b") by finding maximum ("max") and/or minimum ("min") of values "a" and "b" such as, for example, max(a, b) and min(a, b). Said differently, values from R1 and R2 may be obtained and the smaller value may go into R1 and the larger value goes into R2. A set of local registers available for operands and results is a finite resource which is very limited in some processors. If value a and b are taken from registers and will no longer be needed, it would be desirable for both max( ) and min( ) results to replace the inputs, avoiding the need to assign additional registers for them. That is, the number of required registers may be reduced if the max( ) and min( ) results are able to replace the inputs.

With instruction sets of the current state of the art, sequential semantics do not allow this since the second instruction uses both inputs. Also, sending the result of the first instruction to one of the inputs would make the program incorrect. That is, the second instruction will stall until that result is available and use it instead of the desired input value. Accordingly, the enhanced processor system 404 of FIG. 4, may uses values from two source registers to produce results in the two source registers as illustrated in the following pseudocode, which sorts values from two registers (R1 and R2) without using any other registers:

```
// Sort a and b, found in R1 and R2
R1 ← min(R1,R2) // min(a,b),
R2 ← max(reuse,R2) // max (a,b).
```

For example, in cycle 1, a first instruction ("Inst 1") may indicate to the operand MUX 510A to get/read in a first value from a first register (e.g., (R1) or the value from R1) as input into the operand register 512A. The first instruction ("Inst 1") may also indicate to the operand MUX 510B to get/read in a second value from a second register (e.g., (R2) or the value from R2) as input into the operand register 512B.

In cycle 2, the first instruction ("Inst 1") is now in the execution of the processor pipeline 520 and performing a minimum operation (e.g., "min" as the opcode such as, for example, finding the minimum value between the two values) on the values from the operand register 512A (e.g., R1) and the operand register 512B (e.g., R2). The result from identifying the minimum during the minimum opcode in the processor pipeline 520 may be sent/stored to R1 by the target logic 530.

A second instruction ("Inst 2") in the cycle 2 may indicate to the operand MUX 510A to reuse the first value from R1 as input into the operand register 512A. It should be noted that there is no conflict with the first instruction ("Inst 1") indicating to store the result (e.g., value of R1) of the processor pipeline in R1 while also returning R1 to the operand MUX 510A. The second instruction ("Inst 2") may also indicate to the operand MUX 510B to get/read and/or reuse in a second value from a second register (e.g., R2 or the value from R2) as input into the operand register 512B.

In cycle 3, the second instruction ("Inst 2") is now in the execution of the processor pipeline 520 and performing a maximum operation (e.g., "max" as the opcode such as, for example, finding the maximum value between the two values (e.g., values of R1 and R2) from the operand register 512A (e.g., R1) and the operand register 512B (e.g., R2). The result from identifying the maximum during the maximum opcode in the processor pipeline 520 may be sent/stored to the target logic 530, which may be directed to R2.

Figure 6:
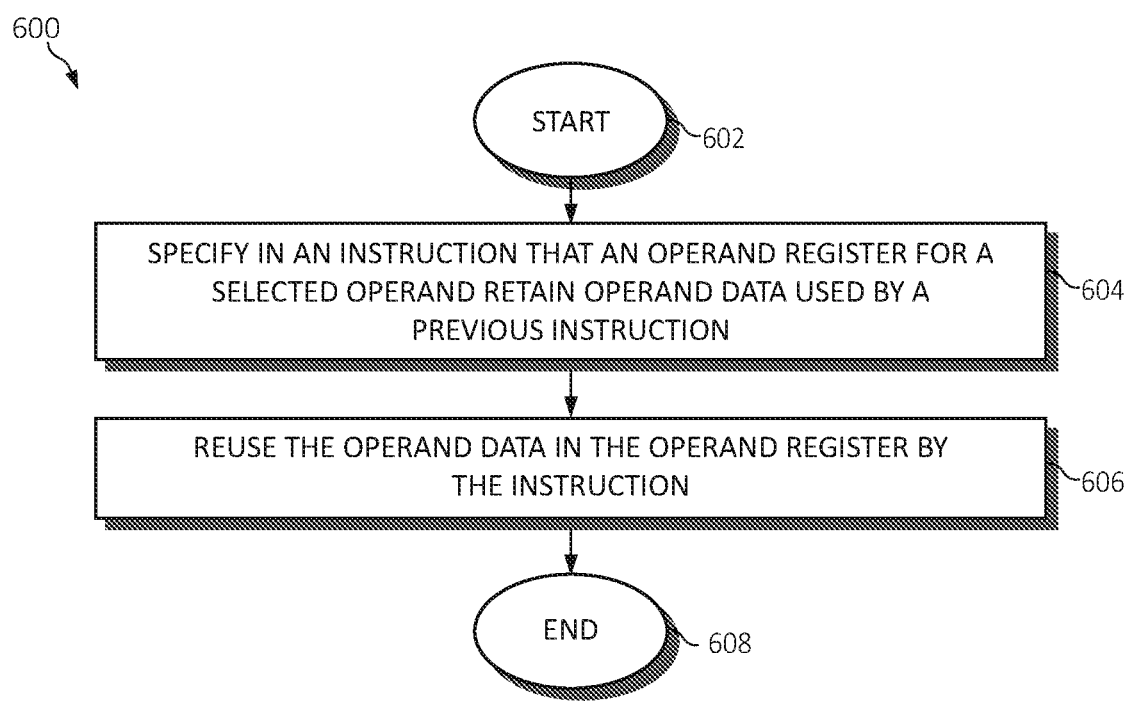
FIG. 6 is a flowchart diagram depicting an exemplary method for reusing an operand in an instruction set architecture (ISA) in a computing environment according to an embodiment of the present invention by a processor, in which aspects of the present invention may be realized.

Turning now to FIG. 6, a method 600 for reusing an operand in an instruction set architecture (ISA) in a computing environment by a processor is depicted, in which various aspects of the illustrated embodiments may be implemented. That is, FIG. 6 is a flowchart of an additional example method 600 for reusing an operand in an instruction in a computing environment according to an example of the present technology. The functionality 600 may be implemented as a method executed as instructions on a machine, where the instructions are included on at least one computer readable medium or one non-transitory machine-readable storage medium. The functionality 600 may start in block 602.

An instruction may specify that an operand register for a selected operand retain operand data used by a previous instruction, as in block 604. The operand data in the operand register may be reused by the instruction, as in block 606. The functionality 600 may end, as in block 608.

In one aspect, in conjunction with and/or as part of at least one block of FIG. 6, the operations of 600 may include each of the following. The operations of 600 may load one or more operands to be used by the instruction into one or more operand registers prior to a first cycle of execution for the instruction.

The operations of 600 may define, in the instruction, behavior of the selected opcode to have an implicit operand, and/or define an operand specifier in the instruction to indicate to the operand register to retain previously used values in the previous instruction.

The operations of 600 may reuse a value in the operand register as indicated by an operand specifier in the instruction having a first operand and a second operand. The value may be a previous value loaded in the operand register by the previous instruction. The operations of 600 may reuse a value from a first in first out buffer ("FIFO") for the operand register.

The operations of 600 may retain a value in the operand register from the previous instruction in the operand register for reuse. The operations of 600 may reuse a value in the operand register as indicated by an operand specifier in one or more of a plurality of instructions. The value may be a previous value loaded in the operand register by a previous instruction. The operations of 600 may reuse two consecutive values in the operand register by the instruction.

The operations of 600 may reuse one or more values from at least two operand registers as indicated by a pair of current instructions. The operations of 600 may sort (e.g., sort may mean the number of results equals the number of sources) and use values from two or more source registers for producing output results in the source registers. The operations of 600 may overwrite the at least two operand registers with new values.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for reusing an operand in an instruction set architecture (ISA) by one or more processors in a computing environment, the method comprising:
 specifying in an instruction that an operand register for a selected operand retain an input value received from a first-in-first-out (FIFO) source and used by a previous instruction, the retaining performed according to an operand specifier value defined, in a given instruction format of the ISA, in a predefined operand specifier field for the selected operand, wherein the operand specifier value indicates, prior to a first processor cycle during which the instruction is performed, to an operand multiplexer to reuse the input value used by the previous instruction, and wherein, upon receiving the operand specifier value, the operand multiplexer returns the input value used by the previous instruction to the operand register for use by the instruction; and reusing the input value in the operand register by the instruction.

2. The method of claim 1, further including retaining the input value in the operand register by one or more subsequent instructions.

3. A system for reusing an operand in an instruction set architecture (ISA) in a computing environment, comprising:
one or more computers with executable instructions that, when executed by a processor of the one or more computers, cause the processor to:
specify in an instruction that an operand register for a selected operand retain an input value received from a first-in-first-out (FIFO) source and used by a previous instruction, the retaining performed according to an operand specifier value defined, in a given instruction format of the ISA, in a predefined operand specifier field for the selected operand, wherein the operand specifier value indicates, prior to a first processor cycle during which the instruction is performed, to an operand multiplexer to reuse the input value used by the previous instruction, and wherein, upon receiving the operand specifier value, the operand multiplexer returns the input value used by the previous instruction to the operand register for use by the instruction; and
reuse the input value in the operand register by the instruction.

4. The system of claim 3, wherein the executable instructions, when executed by the processor, further cause the processor to retain the input value in the operand register by one or more subsequent instructions.

5. A non-transitory computer-readable storage medium having computer-readable program code portions stored therein for reusing an operand in an instruction set architecture (ISA) in a computing environment, the computer-readable program code portions comprising executable instructions that, when executed by a processor, cause the processor to:
specify in an instruction that an operand register for a selected operand retain an input value received from a first-in-first-out (FIFO) source and used by a previous instruction, the retaining performed according to an operand specifier value defined, in a given instruction format of the ISA, in a predefined operand specifier field for the selected operand, wherein the operand specifier value indicates, prior to a first processor cycle during which the instruction is performed, to an operand multiplexer to reuse the input value used by the previous instruction, and wherein, upon receiving the operand specifier value, the operand multiplexer returns the input value used by the previous instruction to the operand register for use by the instruction; and
reuse the input value in the operand register by the instruction.

6. The non-transitory computer-readable storage medium of claim 5, wherein the executable instructions, when executed by the processor, cause the processor to further retain the input value in the operand register by one or more subsequent instructions.

7. The non-transitory computer-readable storage medium of claim 5, wherein the executable instructions, when executed by the processor, cause the processor to further reuse two consecutive values in the operand register by the instruction.

* * * * *